Patented June 8, 1954

2,680,672

UNITED STATES PATENT OFFICE 2,680,672

ANHYDROUS HYDRAZINE PRODUCTION

Maurice C. Taylor, Niagara Falls, N. Y., assignor to Mathieson Chemical Corporation, New York, N. Y., a corporation of Virginia No Drawing. Application June 16, 1949,
Serial No. 99,583

5 Claims. (Cl. 23—190)

The present invention relates to the production of anhydrous hydrazine and provides an improved method by which anhydrous hydrazine may be economically produced.

Heretofore anhydrous hydrazine has generally been prepared from aqueous hydrazine through the use of dehydrating agents, such as caustic soda, barium oxide, or the like. More recently, it has been proposed to produce anhydrous hydrazine by reacting ammonia with hydrazine sulfate, $N_2H_4.H_2SO_4$.

A difficulty heretofore experienced in attempting commercial scale development of a process for producing anhydrous hydrazine by reacting ammonia with hydrazine sulfate has been the large quantity of heat evolved. In small scale operation, the exothermic nature of the reaction has not presented serious difficulty, but it was found that if either strong gaseous ammonia, or a small quantity of liquid ammonia be introduced into a large mass of hydrazine sulfate, the amount of heat evolved is so great as to cause the hydrazine sulfate to sinter to a sticky mass or sometimes to heat the material sufficiently high to cause decomposition.

Experimental research leading to the present invention has disclosed that substantially all of the heat evolved in the reaction just noted is liberated during an early stage of the reaction during which the second replaceable hydrogen of the sulfuric acid is being neutralized whereas the replacement of the hydrazine radical by the ammonia radical is accompanied by little or no evolution of heat and that difficulty heretofore experienced due to excessive evolution of heat may, in large measure at least, be avoided by reacting the ammonia with dihydrazine sulfate $(N_2H_4)_2H_2SO_4$, in place of the hydrazine sulfate heretofore used.

Further difficulties heretofore experienced in the production of anhydrous hydrazine by reacting ammonia with hydrazine sulfate have been the excessive consumption of ammonia and the tendency for the reaction to slow down or cease before approaching completion.

A primary cause of the retarding of the reaction appears to be the early formation of a coating of insoluble salt, ammonium sulfate, for instance, on the outer surface of the hydrazine sulfate used, thus insulating the hydrazine sulfate from the ammonia. I have found that this difficulty can be avoided by using the dihydrazine sulfate and initiating the reaction while a substantial part, at least, of the dihydrazine sulfate is in the liquid phase and preventing the formation of a solid phase comprising ammonium sulfate until all of the hydrazine component is in the liquid phase. Dihydrazine sulfate is soluble in hydrazine and in the presence of sufficient hydrazine to dissolve all of the sulfate at the operating temperature the tendency to form an objectionable coating comprising $(NH_4)_2SO_4$ is minimized. During this initial stage of the operation, i. e., until all of the hydrazine component is in the liquid phase, the ammonia reactant should be added as gaseous ammonia and its addition rate so regulated as to maintain a temperature of the mixture not below about 40° C., nor below that at which a substantial amount of the hydrazine component is liquid.

The dihydrazine sulfate may, with advantage, be maintained in the liquid phase for purposes of the present invention, either by heating sufficiently to fuse the dihydrazine sulfate, or by dissolving or partly dissolving the hydrazine monosulfate in a suitable solvent, advantageously hydrazine.

The operation is initiated, as just noted, by passing gaseous ammonia into contact with the dihydrazine sulfate, at least partly in the liquid phase. Where fused dihydrazine sulfate is used, it may be desired to continue the ammonolysis using gaseous ammonia. It is, however, generally more advantageous to complete the ammonolysis adding liquid ammonia after the major part of the ammonolysis has been effected by adding the ammonia as gaseous ammonia. During the use of gaseous ammonia, care should be taken to see that there is adequate liquid present to dissolve the gaseous ammonia so as to promote the reaction.

It is essential that at the start of the reaction the temperature of the dihydrazine sulfate be such that the dihydrazine sulfate is at least partly in the liquid phase. This can be accomplished by fusing or melting the dihydrazine sulfate. With respect to the melting point of dihydrazine sulfate, a certain amount of confusion exists in the art. Thus, Curtius has stated that the melting point is 85° C., Journal für praktische Chemie (2) 44, 101 (1891). On the other hand, Sommer and Weise stated that the melting point is 118.9° C., Zeitschrift für anorganische Chemie, 94, 54 (1916). In his treatise on inorganic and theoretical chemistry, Mellor mentions the figures published by both Curtius and Sommer and Weise. The most recent chemical handbooks, however, give the melting point as 85° C. The presence of small amounts of anhydrous hydrazine materially lowers the melting point of the dihydrazine sulfate. Thus, a mixture of 95% dihydrazine sulfate and 5% anhydrous hydrazine melts at about 80–90° C. and a mixture of 90% of the former and 10% of the latter melts at about 40–50° C. The minimum initial temperature thus depends on the purity of the dihydrazine sulfate.

As the reaction proceeds with the liberation of hydrazine, the temperature of the reaction mixture may be lowered, but must not be permitted to drop to such an extent that all, or substantially all, of the dihydrazine sulfate will solidify. Near the completion of the reaction, to the point where the hydrazine is substantially completely liberated, the temperature of the reaction mixture may drop to as low as about 40° C. At temperatures below about 40° C., there is a tendency for ammonium sulfate triammonate to form and separate out as a solid. This should not be permitted until all of the dihydrazine sulfate has been dissolved and preferably until all of the hydrazine has been liberated, as the triammonate likewise tends to form an insulating coating on the surface of any solid dihydrazine sulfate present. After substantially all of the hydrazine has been liberated, the formation of ammonium sulfate triammonate is not especially objectionable.

In order to maintain the necessary operating conditions, I have found it particularly advantageous to carry out the major portion of the ammonolysis under superatmospheric pressure and at a temperature not lower than about 40° C.

The operation may be started at atmospheric pressure, or a somewhat lower pressure, in the presence of hydrazine, or other compatible solvent for the dihydrazine sulfate, but, as the reaction proceeds, it is advantageous to increase the pressure as the ammonia is added as otherwise the temperature of the liquid phase at equilibrium with the ammonia vapor will decrease as the proportion of ammonia increases and an uneconomical proportion of ammonia will be required to obtain a reasonable conversion of the dihydrazine sulfate to hydrazine.

As previously indicated, below about 40° C. one of the solid products will be the triammonate of ammonium sulfate $(NH_4)_2SO_4 \cdot 3NH_3$, which is a bulky solid, difficult to handle and requiring excessive amounts of liquid ammonia to wash residual hydrazine therefrom. While temperatures below 40° C. may be used in the latter stages of the reaction, I have found it particularly advantageous to maintain the temperature throughout the reaction at not less than 40° C. ±3° C., the formation of ammonium sulfate triammonate thus being avoided and the stable solid formed being largely, or entirely, ammonium sulfate.

Even when the operation is started at atmospheric or lower pressure in the presence of hydrazine in an amount sufficient to dissolve the dihydrazine sulfate, it is advantageous later to increase both the temperature and pressure during the addition of the ammonia so as to promote the solution of the gaseous ammonia in the liquid phase without immediate precipitation of a solid phase which would occur at lower temperatures. At the lower pressures, uneconomical proportions of ammonia would be required in the gaseous phase in order to obtain sufficient ammonia dissolved in the liquid phase to promote the reaction at an economically attractive rate of conversion of the dihydrazine sulfate in the liquid phase to hydrazine.

This temperature condition is preferably maintained not only during the reaction, but also up to, and including, the separation of the solid from the liquid phase as by filtration. This usually requires that superatmospheric pressure be maintained on the reaction mixture up to and including the filtering steps so as to avoid excessive cooling due to vaporization of ammonia. What has been said with respect to pressure during the filtering, also applies to the washing of the filter cake.

Predicated upon these discoveries, the present invention comprises in its broader aspect, the reacting of ammonia with dihydrazine sulfate, while maintaining the latter at least in part in liquid phase, as by fusion or solvent action, during the entire reaction and advantageously at a temperature not less than about 40° C. ±3° C. The optimum temperature varies somewhat with the purity of the liquid ammonia. In pure liquid ammonia, the transition point of ammonium sulfate triammonate is 43° C. Where the ammonia contains hydrazine, the temperature of the transition point may be 5–6° C. lower. In accordance with the present process, the temperature will advantageously be maintained above that transition temperature.

Following the resultant reaction, the anhydrous hydrazine thus formed may be recovered, for instance, by separating the liquid phase consisting essentially of hydrazine and ammonia from the solid phase consisting essentially of ammonium sulfate and separating the anhydrous hydrazine and ammonia by known procedure, as by distillation. The solid phase is advantageously washed with liquid ammonia to recover residual hydrazine which may be separated from the wash ammonia by suitable conventional procedure. However, in accordance with a particularly desirable aspect of the present invention, the ammonia used for washing the solid phase, and still containing residual hydrazine, is used in part at least to react with further dihydrazine sulfate, as heretofore described.

Advantageously, a portion of the anhydrous hydrazine thus recovered, either in admixture with liquid ammonia or in the substantially pure form, may be returned to the zone of the primary reaction to act as a solvent for the dihydrazine sulfate in the early stages of the operation for the purpose heretofore explained.

Pressure conditions may be varied considerably, but a pressure in excess of atmospheric pressure is generally advantageous in increasing the solubility of the ammonia in the liquid phase reaction mixture at elevated temperatures and thus promoting the desired reaction. The pressure must be high enough to maintain the hydrazine and a substantial portion of the ammonia in liquid phase during the entire reaction under existing temperature conditions.

One advantageous method of operation is to initiate the reaction using fused dihydrazine sulfate and admitting ammonia vapors to the reaction under pressure and to cool the reaction zone as the reaction proceeds with the formation of hydrazine. The reaction mixture is agitated and ammonia vapor added at a rate to maintain the desired rate of reaction. As ammonia is added the pressure is increased until at least the stoichiometric equivalent of the dihydrazine sulfate has been added. Thereafter, the remaining ammonia may, with advantage, be added as liquid ammonia and the pressure will be determined largely by the vapor pressure of the liquid ammonia at the temperature of the mixture.

The proportion of ammonia to dihydrazine sulfate is not critical, but a substantial excess of ammonia is always desirable to force the reaction in the required direction.

Ammonium sulfate is appreciably soluble in hydrazine, but is almost insoluble in liquid ammonia. When the presence of ammonium sulfate, dissolved in the liquid product, is not objectionable, less liquid ammonia may be used, but the greater the dilution with excess liquid ammonia, the higher the purity of the resultant hydrazine with respect to the dissolved sulfate. When too little excess ammonia is used, the degree of conversion will be lowered. It is possible to produce sulfate-contaminated hydrazine and purify it by distillation, recycling recovered sulfates to the process. Further, the exact proportion of ammonia in the final reaction mixture will depend on economic factors. I have found it generally desirable to use such proportions of the reactants as will produce, after separation of ammonium sulfate, a liquid phase containing about 90 mole percent of ammonia. On separating the ammonia therefrom by evaporation, I have thus obtained as the residual, anhydrous hydrazine containing less than 0.01% of ammonium sulfate. It presently appears that an amount of ammonia equivalent to at least 50% to 60%, by weight, of the reaction mixture should be used to obtain directly hydrazine of satisfactorily low sulfate content.

When operating by the herein described procedure, it is usually advantageous though not necessary that the hydrazine sulfate be pure dihydrazine sulfate. A considerable proportion of hydrazine sulfate may be present, the permissible proportion being dependent upon the amount of reaction heat which may be tolerated. As a rule the hydrazine sulfate present should not exceed about 20-25% and is more advantageously entirely omitted, or at least kept at a minimum.

The process will be further described and illustrated by the following specific examples:

*Example I*

3,649 parts of dihydrazine sulfate of a purity equivalent to 39.7% hydrazine and of a particle size of about 1 inch or less was stirred in a closed reactor with 337 parts of 95% hydrazine, and heated to a temperature of about 37° C. To the resultant solution of dihydrazine sulfate, there was slowly added 8,450 parts of anhydrous liquid ammonia over a period of about three hours. During the addition of the ammonia, the temperature of the reaction mixture was held at 41°± 3° C. and the pressure rose to a maximum of 208 pounds (gauge) per square inch. Finally the resultant slurry was heated to 46° C. and filtered under its own pressure of about 231 pounds per square inch, gauge. The filtered solids were washed with 2,720 parts of anhydrous ammonia. The filtrate, on evaporation of the ammonia by flashing to one atmosphere at room temperature, yielded 1,725 parts of a product containing 96.3% of anhydrous hydrazine and 1.8% anhydrous ammonia. The wash liquor yielded a total of 102 parts of a product containing 92.3% hydrazine and 2.6% ammonia.

The total recovery of anhydrous hydrazine was about 1,755 parts equivalent to 99.3% of the theoretically possible yield of 1,768 parts hydrazine. The net recovery, after deducing recycled material, was 1,435 parts out of a net hydrazine input of 1,448 parts, or 99.1% recovery. The hydrazine content of the combined product on an ammonia-free basis was 97.9%.

The foregoing example is illustrative of an operation in which the dihydrazine sulfate was first dissolved in anhydrous hydrazine and initiated at moderate temperature. The following example is illustrative of an operation in which the liquid phase of the dihydrazine sulfate is obtained by initially fusing the dihydrazine sulfate.

*Example II*

Approximately 345 parts of dihydrazine sulfate was fused by heating to a temperature of 130° C. in an agitated pressure vessel under a vacuum of about 30 inches of mercury. Ammonia vapor was then charged to the vessel at a gauge pressure of 275 pounds per square inch. As the reaction proceeded with formation of hydrazine, the temperature was gradually reduced to 56° C. by passing cooling water through a jacket surrounding the reactor, while additional ammonia was supplied to the reactor to maintain the above-indicated pressure as rapidly as the ammonia was absorbed by the liquid. A total of about 100 parts of ammonia vapor was thus added. Thereafter, ammonia vapor was discontinued and liquid ammonia (wash liquor from the previous operation) containing in all about 28 parts of hydrazine, together with sufficient fresh ammonia to make a total of about 800 parts was then added to the pressure vessel with continued cooling to bring the temperature down to about 50° C. Thereafter, the solution was filtered under its own vapor pressure and the filter cake was washed with 890 parts of additional fresh ammonia. The original filtrate and the wash filtrate were separately collected and the latter set aside for use in the succeeding operation. Upon evaporation of the ammonia, the original filtrate yielded 138 parts of a liquid, which was 95.8% hydrazine or the equivalent of about 96% of the theoretical possible yield of anhydrous hydrazine based on the dihydrazine sulfate charge.

Where the dihydrazine sulfate is maintained in the liquid phase by fusion, the initial temperature should be maintained substantially in excess of the fusion point, for instance, 130° C., as shown in the preceding example. Where the dihydrazine sulfate is maintained liquid by dissolving in hydrazine, temperatures within the range of about 40-60° C. are generally advantageous.

In the fusion type operation, gaseous ammonia may be bubbled through the fused body of sulfate or simply injected into the confined space above the liquid level and pressure conditions should be such as to cause the dissolving of substantial amounts of ammonia in the liquid in order to expedite the reaction. During the addition of liquid ammonia, the pressure should be sufficient to maintain the added liquid ammonia substantially in liquid phase. This pressure is advantageously maintained throughout the filtering and washing operations, as previously indicated, so as to prevent cooling to a temperature below about 40° C. by vaporization of the ammonia.

Reference is made to the application of Charles C. Clark, Serial No. 72,092, filed January 21, 1949, in which the manufacture of hydrazine by the reaction of a hydrazine sulfate and ammonia using an aliphatic ether or alcohol is disclosed.

I claim:

1. Process for the production of anhydrous hydrazine which comprises reacting anhydrous dihydrazine sulfate with ammonia while maintaining at least a substantial part of the dihydrazine sulfate in liquid phase throughout the reaction and while maintaining the temperature of the reaction mixture at least about 40±3° C., and thereafter recovering anhydrous hydrazine from the reaction mixture.

2. Process for the production of anhydrous hydrazine which comprises reacting anhydrous dihydrazine sulfate with ammonia under superatmospheric pressure and at a temperature at least about 40±3° C. and maintaining at least a substantial part of the dihydrazine sulfate in liquid phase throughout the reaction, and thereafter recovering anhydrous hydrazine from the reaction mixture.

3. Process for the production of anhydrous hydrazine which comprises reacting anhydrous dihydrazine sulfate with ammonia, maintaining at least a substantial part of the dihydrazine sulfate in liquid phase throughout the reaction and maintaining the temperature of the reaction mixture at least about 40±3° C. until all of the dihydrazine sulfate has been dissolved in the resultant hydrazine, and thereafter recovering anhydrous hydrazine from the reaction mixture.

4. Process for the production of anhydrous hydrazine which comprises passing gaseous ammonia in contact with fused anhydrous dihydrazine sulfate under superatmospheric pressure until ammonia in an amount at least the stoichiometric equivalent of the sulfate has been added, thereafter cooling the reaction mixture to a temperature not less than at least about 40±3° C. and continuing the reaction by passing liquid ammonia into the reaction mixture, and thereafter recovering anhydrous hydrazine from the reaction mixture.

5. Process for the production of anhydrous hydrazine which comprises reacting anhydrous dihydrazine sulfate under superatmospheric pressure with ammonia at a temperature of at least about 40±3° C., at least a substantial part of the dihydrazine sulfate being maintained throughout the reaction in the liquid phase by dissolving in hydrazine, and thereafter recovering anhydrous hydrazine from the reaction mixture.

References Cited in the file of this patent

J. W. Mellor's "Inorganic and Theoretical Chemistry," vol. 2, 1922 Ed. page 699; vol. 8, pp. 315 and 325–6; 1928 Ed. Longmans, Green & Co., N. Y.

"Handbook of Chemistry & Physics," 28th ed., pp. 344, 345, 388, 389. Chemical Rubber Publishing Co., Cleveland, Ohio.

"Chem. Abstracts," vol. 6 (1912), page 579, and vol. 7 (1913), page 1682.

Journ. Amer. Chem. Soc., vol. 33 (1911), pp. 1728–1742.

"Concise Chemical and Technical Dictionary" by H. Bennett, 1947 ed., page 479. Chem. Pub. Co., Inc., Brooklyn, N. Y.

"Handbook of Chemistry," by Lange, 7th ed. (1949), pp. 220, 221. Published by Handbook Publishers, Inc., Sandusky, Ohio.

"Chem. Engineers' Handbook" by Perry, 1950 ed., pp. 116–117. The McGraw-Hill Book Co., N. Y.